United States Patent [19]

Stephens

[11] 3,800,993

[45] Apr. 2, 1974

[54] CAPSTAN TENSIONER

[76] Inventor: John F. Stephens, 3513 Pacific Ave., Burbank, Calif. 91505

[22] Filed: Feb. 18, 1971

[21] Appl. No.: 116,453

[52] U.S. Cl. .................................. 226/187, 226/193
[51] Int. Cl. .................................................. B65h 17/22
[58] Field of Search ............ 226/181, 187, 140, 193

[56] References Cited

UNITED STATES PATENTS

| | | | |
|---|---|---|---|
| 2,913,192 | 11/1959 | Mullin | 226/186 X |
| 3,099,376 | 7/1963 | Kennedy | 226/181 X |
| 3,559,861 | 2/1971 | Knox | 226/190 X |

*Primary Examiner*—Allen N. Knowles
*Assistant Examiner*—Gene A. Church

[57] ABSTRACT

A differential tape drive capstan having a multiple number of annular alternating rounded depressions and ridges of equal width extend throughout the length of a power-driven cylindrical element. On a parallel axis at one side of the capstan is a cylindrical element having complementary rounded ridges and depressions meshing with respective depressions and ridges of the capstan and between which passes a relatively wide sound tape, pressed into the form of the ridges and depressions during its travel therebetween. On the opposite side of the capstan is a second cylindrical element also on a parallel axis possessed of a smooth cylindrical exterior surface mounted adjacent the capstan at a location such that the tape passes undistorted between the capstan and the second cylindrical element.

4 Claims, 4 Drawing Figures

PATENTED APR 2 1974

3,800,993

INVENTOR.
JOHN F. STEPHENS
By
Beehler, Arant & Jagger
ATTORNEYS.

CAPSTAN TENSIONER

Prompted by demands for increasingly greater fidelty and capacity in the television industry, wider tapes have been developed. With the development and use of wider tapes reels naturally have to be correspondingly wider and, consequently, the load on the tape drive mechanism is correspondingly increased. Heretofore tapes of one inch in breadth have been common and considered to be adequate. The more recent trend is for tapes two inches in breadth. Unless the two-inch tape can be made thinner, a given number of lineal feet of two-inch tape will weigh twice as much as a corresponding number of lineal feet of one-inch tape.

Inasmuch as it is highly desirable for such tape to be run past the recording head and playback head at a constant predictable speed the load on the system, due to use of tapes of increased width, increases the problem of mounting the larger operating parts in such fashion that a dependable tape speed can be assured, inasmuch as, as in any piece of machinery, certain manufacturing tolerances must be observed if the machinery is to be constructed and assembled economically.

Recognizing the fact that the speed of rotation of pay-off reels and take-up reels may tend to vary from the norm, certain expedients have been attempted to make certain that the speed of the tape throughout that portion of the tape drive, where the tape passes the recording head and playback head, be kept dependably constant. Such precautions have materialized into certain devices exemplified by Mullin U.S. Pat. No. 2,913,192 and De Moss U.S. Pat. No. 3,282,486. The expedient utilized in these patents is to provide a driving capstan having circumferential portions of different diameter coupled with nip-rollers for deforming the tape as it passes the capstan on one side to a location closer to the center of rotation than on the opposite side thereby producing a differential in speed of tape movement sufficient to put tension on the tape in the loop between opposite sides of the drive capstan and a reversing cylinder. Although such an expedient has helped to maintain dependable tension and acceptable steadiness in speed past the recording and reproducing heads, the means employed for deforming the tape has been such as to create permanent strains and deformations in the tape too firmly embedded to be ironed out by the tension generated as the tape passes the recording and playback heads. Obviously it is at such locations where the effect of distortions in the tape is most undesirable.

It is therefore among the objects of the invention to provide a new and improved capstan tensioner for a tape drive assembly the effect of which is spread substantially uniformly throughout the width of the tape, regardless of the tape breadth, whereby to substantially minimize deformation of the tape as it passes from the capstan to the recording and reproducing heads and is then removed and passed on to the take-up roll.

Another object of the invention is to provide a new and improved capstan tensioner making use of alternating areas of varying diameter on the capstan wherein the difference in diameter is held to a very small amount insufficient to create troublesome ripples in the tape but which, at the same time, is spread over the tape with a sufficient degree of completeness sufficient to provide all the tension which may be necessary in order to pass the loops of the tape at constant speed past the recording and playback heads.

Still another object of the invention is to provide a new and improved capstan tensioner capable of setting up a moderate tension in the tape where it passes the recording and reproducing heads but wherein those portions of the capstan which account for a slight deformation of the tape are so constructed that strain on the material of the tape is substantially minimized and permanent deformation avoided while, at the same time, providing a grip on the tape sufficiently dependable to greatly enhance the steadiness and dependability of tape drive through the recording and reproducing loop.

With these and other objects in view, the invention consists in the construction, arrangement, and combination of the various parts of the device, whereby the objects contemplated are attained, as hereinafter set forth, pointed out in the appended claims and illustrated in the accompanying drawings.

DETAILED DESCRIPTION

Figure 1:
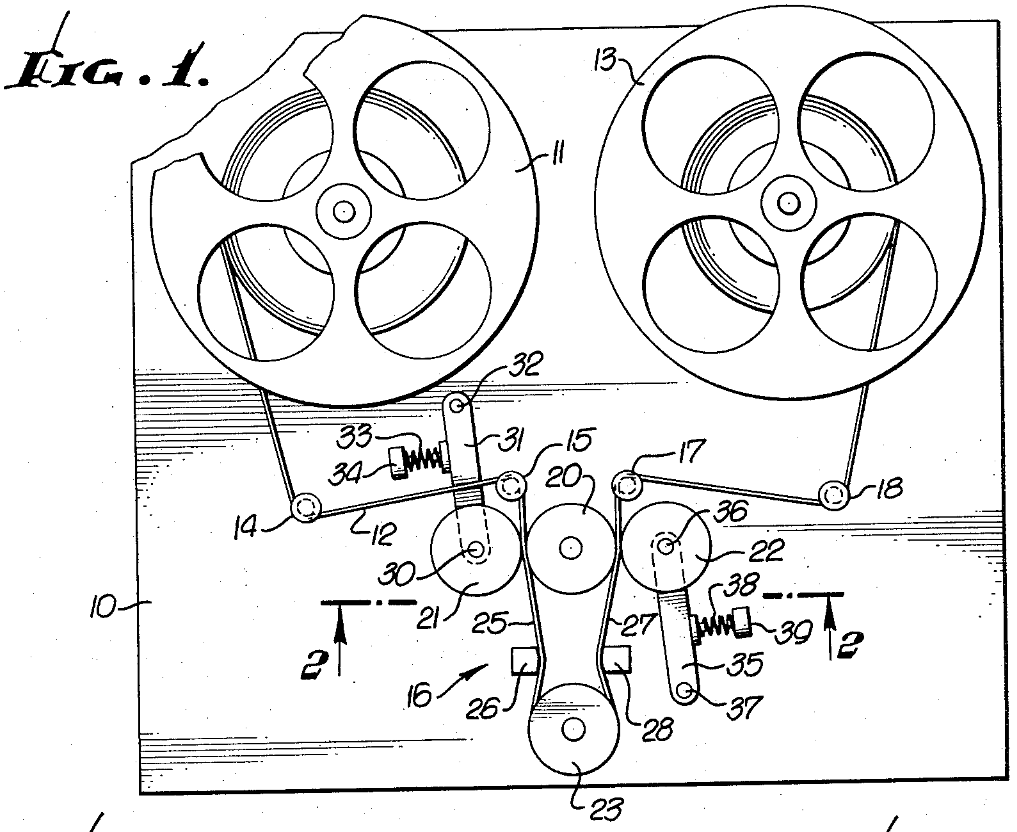
FIG. 1 is a plan view of a substantially conventional tape drive assembly.
Figure 2:
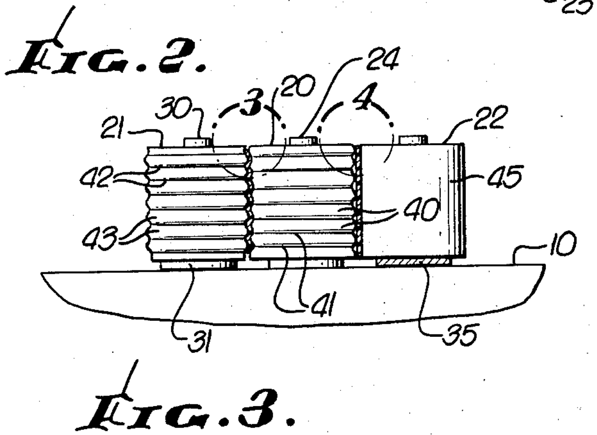
FIG. 2 is a fragmentary elevational view on the line 2—2 of FIG. 1.

In an embodiment of the invention chosen for the purpose of illustration, there is shown a base indicated by the reference character 10 upon which a substantially conventional tape drive mechanism is mounted exemplified by a feed or pay-out reel 11 which feeds a magnetic tape 12 to a take-up reel 13. Leaving the feed reel 11 the tape is shown first passing through substantially conventional guide rollers 14 and 15 on its way to a tape drive assembly indicated generally by the reference character 16. Leaving the assembly the tape 12 passes another set of guide rollers 17 and 18 to the take-up reel 13.

The tape drive assembly 16 consists in the main of a power-actuated drive capstan 20, a pair of oppositely mounted idler cylinders 21 and 22 and a tape direction reversing cylinder 23.

The drive capstan 20 is vertically mounted on a suitable shaft 24 on the base 10, appropriate conventional guide means not being shown. The direction reversing cylinder 23 is spaced an appreciable distance from the capstan 20 sufficient to provide a loop 25 which passes a recording head 26 and a loop 27 which passes a playback head 28.

The idler cylinder 21 is pivotally mounted by means of a shaft 30 upon an arm 31 which, in turn, is pivotally mounted by means of a shaft 32 upon the base 10.

A coil spring 33 acting between a spring keeper 34 on the base 10 and the arm 31 normally urges the arm 31 in a counter clockwise direction as viewed in FIG. 1, a direction which tends to move the idler cylinder 21 into circumferential engagement with the drive capstan 20.

Similarly on the opposite side an arm 35 has the idler cylinder 22 rotatably mounted thereon by means of a shaft 36, there being provided a shaft 37 to pivotally mount the arm 35 on the base 10. Here also a coil spring 38 acting between a spring keeper 39 and the arm 35 urges rotation of the arm 35 in a counter clockwise direction as viewed in FIG. 1 in which the idler cylinder 22 is urged toward a surface-to-surface engagement with the drive capstan 20.

In the chosen embodiment the capstan 20 on its cylindrical exterior is provided with a series of rounded annular protrusions 40 numbering seven in the chosen embodiment. The rounded protrusions 40 alternate with shallow rounded depressions 41. The character of the rounded protrusions and depressions is shown to good advantage in the enlarged fragmentary sectional view of FIG. 3 wherein the surfaces of the protrusions and depressions are joined smoothly together in one continuous warped surface productive of an undulating pattern of alternating protrusions and depressions throughout the length of the drive capstan 20. Good practice demonstrates that the difference between the radial distance of the crown of the protrusion 40 from the axis of rotation of the drive capstan and the radial distance of the bottom of the depressions 41 should be about between .003 and .005 inch.

The idler cylinder 21 is provided with a multiple series of alternating depressions and protrusions corresponding generally in number and size to the protrusions and depressions of the drive capstan except that they are complementarily located. This is to say that depressions 42 of the idler cylinder stand opposite the protrusions 40 of the drive capstan and protrusions 43 of the idler cylinder 21 stand opposite and are substantially received in the depressions 41 of the drive capstan 20.

There is, however, a slight difference in construction of the successive protrusions and depressions of the idler cylinder 21 in that although the protrusion 43 of the idler cylinder 21 is substantially the same conformation as the depression 41 of the capstan, the depression 42 of the idler cylinder is bowed slightly outwardly relative to the curvature of the protrusion 40 of the capstan so that it stands away from the tape 12 at those points. Accordingly, the tape 12 will be pressed into engagement with the drive capstan 20 only at the bottoms of the depressions 41 and not at the tops of the protrusions 40, in which area the tape will be permitted to assume its own position due to the inherent resiliency in the tape material itself.

Since the intention is to have the tape 12 contact only the protrusions 40 of the drive capstan 20 on the side which feeds the take-up reel 13, the idler cylinder 22 is provided with a substantially continuous cylindrical surface 45, the diameter of which is preferably substantially equal to the diameter of that portion of the drive capstan 20 exemplified by the protrusions 40.

In operation as the tape 12 is paid off the feed reel 11 past the guide rollers 14 and 15 to the capstan 20, the tape will be pressed into engagement with the recesses 41 of the drive capstan, the recesses 41 being at a lesser distance from the center of rotation than the distances of the protrusions 40 from the same center of rotation.

On the opposite side of the drive capstan the points of contact will be at the crown of the protrusions 40 which is at a greater radial distance from the center of rotation than the depressions 41. Accordingly, there will be a tendency of the tape in the loop 27 to be driven slightly faster than the tape is driven where it contacts the drive roller on the opposite side.

Actually there will be no real difference in the speed of travel due to the fact that the tape elongates slightly because of this differential in speed.

Figure 3:
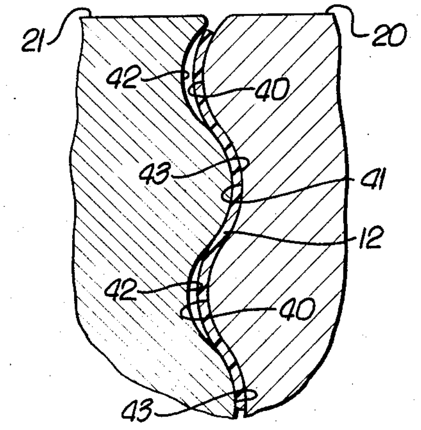
FIG. 3 is a fragmentary longitudinal sectional view within the circled area 3 of FIG. 2.
Figure 4:
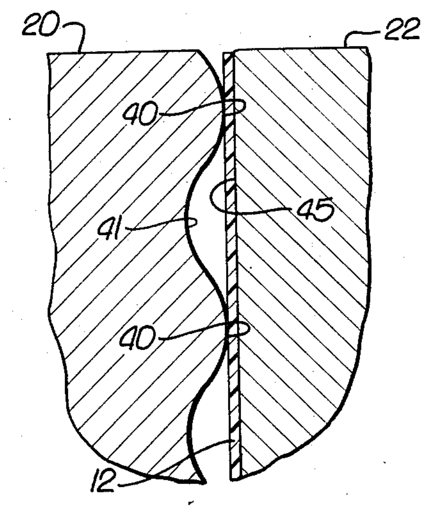
FIG. 4 is a fragmentary longitudinal sectional view within the circled area 4 of FIG. 2.

By reason of the fact that there is so little difference in distance between the tops of the protrusions and the bottoms of the depressions on the drive roller from the center of rotation, the difference in speed will not be great and, hence, there will be relatively little elongation in the tape within the loops 25 and 27, insufficient to cause distortion in the recording or playback operations. The tendency to elongate, moreover, is minimized by the temporary mild deformation of the tape caused by the complementary engagement of respective protrusions and recesses of the idler cylinder 21 with the drive capstan 20 as shown in FIG. 3.

Furthermore because of the relatively little difference in distance as described above and because of the very smooth transition in surface contour between protrusions and depressions the tape is only very mildly deformed and ripples and strains are accordingly avoided. The very modest difference in radial distances referred to, which as described create only a small difference in the apparent speed of travel of the tape, is compensated for by the relative large number of areas where the tape is forced into contact with the drive capstan.

The effect of the structure described is to spread a very modest tape deformation over the entire breadth of the tape but in total amount sufficient to carefully control tension and stretch of the tape and, at the same time, avoid permanent deformation of the tape material.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A differential tape drive assembly for operation in a drive train for magnetic tape comprising a base, a drive capstan rotatably mounted on said base, a direction reversing cylinder for said tape rotatably mounted on said base in spaced relationship with said drive capstan, a first idler cylinder rotatably mounted on said base on one side of said capstan including means urging said idler cylinder into engagement with said capstan, a second idler cylinder rotatably mounted on said base on the opposite side of said capstan including means urging said second idler cylinder into engagement with said capstan, said capstan having a multiple number of axially spaced annular gently rounded protrusions extending throughout the length of the exterior surface of said capstan and a gently rounded relatively shallow depression intermediate adjacent rounded protrusions, the surface area of the depressions and the surface area of the protrusions being substantially equal, surfaces forming said depressions and protrusions being joined smoothly together forming an uninterrupted undulating pattern throughout the length of the capstan, one of said idler cylinders having a multiple number of alternating depressions and protrusions complementary to respective protrusions and depressions of the capstan and meshing therewith whereby to grasp the tape traveling in one direction therebetween, the other of said idler cylinders having a surface in engaging relationship with only the protrusions of said capstan whereby to grasp the tape traveling in the other direction therebetween.

2. A differential tape drive assembly as in claim 1 wherein the radial distance between the tops of the depressions and the bottoms of the depressions of said one idler cylinder is greater than the radial distance between the tops of the depressions and the bottoms of the depressions of said capstan whereby the tape is contacted only at the bottom of the depressions of the capstan.

3. A differential tape drive assembly as in claim 1 wherein the radial distance between the tops of the protrusions and the bottoms of the depressions is from about 0.003 to about 0.005 inch.

4. A differential tape drive assembly as in claim 1 wherein there are not less than six depressions on the capstan and a corresponding number of protrusions on said one idler cylinder.

* * * * *